United States Patent [19]

Peng

[11] Patent Number: 5,236,069

[45] Date of Patent: Aug. 17, 1993

[54] BRAKING DEVICE FOR INDOOR EXERCISE BICYCLES

[75] Inventor: Yee-Hong Peng, Hsin-Chu Hsin, Taiwan

[73] Assignee: Peng, Huan-Yau, Hsin-Chu, Taiwan

[21] Appl. No.: 907,641

[22] Filed: Jul. 2, 1992

[51] Int. Cl.$^5$ ............................................. F16F 15/03
[52] U.S. Cl. .................... 188/267; 242/288; 310/93; 310/105; 482/6; 482/63; 482/903
[58] Field of Search ............... 188/267; 310/44, 93, 310/105; 482/6, 57, 903, 63; 242/288

[56] References Cited

U.S. PATENT DOCUMENTS

| 2,834,895 | 5/1958 | Papst ........................................ 310/44 |
| 3,891,879 | 6/1975 | Yamada et al. ...................... 310/44 X |
| 5,072,930 | 12/1991 | Sun ................................... 482/903 X |
| 5,143,183 | 9/1992 | Kuwahara ........................... 188/267 |

FOREIGN PATENT DOCUMENTS

| 410589 | 5/1934 | United Kingdom ................ 310/105 |
| 2057628 | 4/1981 | United Kingdom ................ 188/267 |

Primary Examiner—George A. Halvosa
Attorney, Agent, or Firm—Larson and Taylor

[57] ABSTRACT

This invention relates to a braking device for indoor exercise bicycles. In particular, this device is composed of a rotor, multiple rubber magnets, a wheel for the transmission belt, a stator, a coil, two pivot bearings, and an axle; when all of these components are assembled in place, the transmission belt can start the wheel for the transmission belt which drives the rotor in spin, producing relative motion between the rubber magnets of the rotor and the coil of the stator. There are magnetic flux loops between the rubber magnets and the stators. Hence, as the rotor spins, the coil crossed by the magnetic force lines will induce a potential, which by shorting the two ends of the coil starts a current and produces an inverse magnetic field, thus exerting a braking force upon the rotor or, in effect, achieving the end of consuming user energy.

4 Claims, 3 Drawing Sheets

BRAKING DEVICE FOR INDOOR EXERCISE BICYCLES

FIELD OF THE INVENTION

This invention relates to a braking device for indoor exercise bicycles. In particular, this device produces an inverse magnetic field by a coil to attract the rotor, resulting in the braking effect, which can be applied to any pedaling exercise equipments.

BACKGROUND OF THE INVENTION

Due to busy pace in modern living, indoor exercises have grown extremely popular. Among them, the exercise bicycle has become one of the most popular exercise equipments. To consume the energy of the user, traditional exercise bicycles adopt the following braking means:

Friction Type:

Most traditionally used, it mainly adopts such material as woolen rug to impede the rotor by direct friction, thus achieving the braking purpose. The merits are simple construction and low cost. However, the drawbacks include (1) The frictional force at startup and low speed is greater than that in high speed operation, resulting in an unsmooth impedance characteristic, which causes an unsmooth feeling at restart from pause in the exercise process; (2) The braking force can not be conveniently adjusted by an electronic circuit; (3) The amount of exercise can not be precisely measured.

Later, design of various braking devices in different constructions came out in succession.

Vortex Braking Device:

A magnetic force control system is used to provide control without a dynamo. The merits are (1) lower manufacturing cost as compared to those with a dynamo and (2) no disturbance from magnetic noise. However, to produce the braking force, it requires either (1) external power control or (2) mechanical approach to alter the braking magnetic force. The drawbacks are in the former case (1) danger of electric shock by leakage or trip off by the electrical wire, and in the latter case (2) slow response time, high cost, and sometimes the mechanical noise of the control mechanism.

Dynamo Braking Device:

All merits are derived from a built-in dynamo in the device: (1) free from battery or external power control; (2) The amount of electricity generated is directly proportional to the consumption of calories by user, which can be precisely converted to show the amount of exercise for user's reference; (3) The amount of braking can be directly controlled by the electrical signal, which enables more entertaining exercise process when coupled with appropriate man-machine interface by electronic circuits. However, the drawbacks include (1) high cost; (2) Inverting magnetic force by magnetic poles produces noise; (3) Magnetized dynamos exhibit such problems as nonlinearity and insufficient power; (4) Common permanent magnet dynamos with few magnetic poles exhibit such problems as dead starting angles.

Vortex Braking Device Incorporated With a Dynamo:

It shares the merits of both vortex and dynamo braking devices. However, soaring cost inhibits its popular use.

SUMMARY OF THE INVENTION

In view of this situation, the inventor aspired to research on an ideal braking device, based on his years' experience in technology and product development. Through careful design and various experiments this braking device for exercise bicycles was invented as follows.

The main purpose of this invention is to provide a new braking device for exercise bicycles which can eliminate the drawbacks and inconvenience as found in traditional ones. This new braking device consists of a rotor, multiple rubber magnets, a wheel for the transmission belt, a stator, a coil, two pivot bearings and an axle.

It is characterized by (1) An outer rotor: It produces larger inertial and angle velocity. Tiled throughout the inner rim of the rotor are multiple (as many as 144 in this example) NS polarized rubber magnets with each magnet as narrow as 4 mm, which can secure the soft rubber magnets closer to the rotor without deformation as acted upon by the centrifugal force of the spinning rotor;

(2) An inner stator: To and fro pasted throughout the outer rim of the stator are a layer of enamel wire arranged in parallel and equal number to the soft magnetic poles of the rotor, to serve as the dynamo coil. The stator supports the coil and is pivoted within the rotor to form a magnetic loop with the rubber magnets of the rotor.

As the rotor spins, the magnetic loop between the rubber magnets and the stator will cross the coil and produce a potential on the wire of the coil. Suppose that the two ends of the wire are connected to conduct a loop current, an inverse magnetic field opposing the crossing of magnetic lines will be produced by the conducting wire to attract the rotor, resulting in the braking effect. The larger the loop current flows on the conducting wire, the stronger the inverse magnetic field attracts the rotor, and in effect, the greater the braking force is applied to the rotor.

Based on the above braking process, this invention has the following merits:

(1) Low cost: (i) Use of rubber magnets reduces the cost and facilitates the tiling process (bending is easier than surface grinding); (ii) The total number of coil windings required is smaller in the pasting than in conventional dynamos, which reduces the cost of copper wire; (iii) Low output power also reduces the cost of required controllers.

(2) Linearity of multiple-pole permenent magnet dynamos: Conventional dynamos contain 6–12 magnetic poles while the device of this invention contains up to over 144 magnetic poles, which contribute to a significant attraction force between the magnetic poles and the coil even at low spin rate. Thus, power and braking force are not lost at low speed, facilitating a smoother operation for brake users of exercise bicycles.

(3) Minimal noise: (i) Weak magnetic force of individual rubber magnets, and (ii) absence of magnetic inversion in the magnetic loop both contribute to minimal noise.

(4) Ease of control: Low output power precludes use of controllers with large power capacity. Also, the controllers are less susceptible to burnout.

(5) Smooth startup: (i) The magnetic poles uniformly distribute the magnetic flux density throughout the rim of the magnetic loops; (ii) There's no magnetic inversion in the magnetic flux loop. Hence, the dead startup angle and honing magnetic noise in conventional dynamos are seen no more.

(6) The pasting of the coil on the outer rim of the stator enables more efficient dispersion of power and thus allows higher input of power.

BRIEF DESCRIPTION OF THE DRAWINGS

To help better understand the device construction, purpose, and functions of this invention, I take a preferred embodiment for example with detailed explanations and figures.

Figure 1:
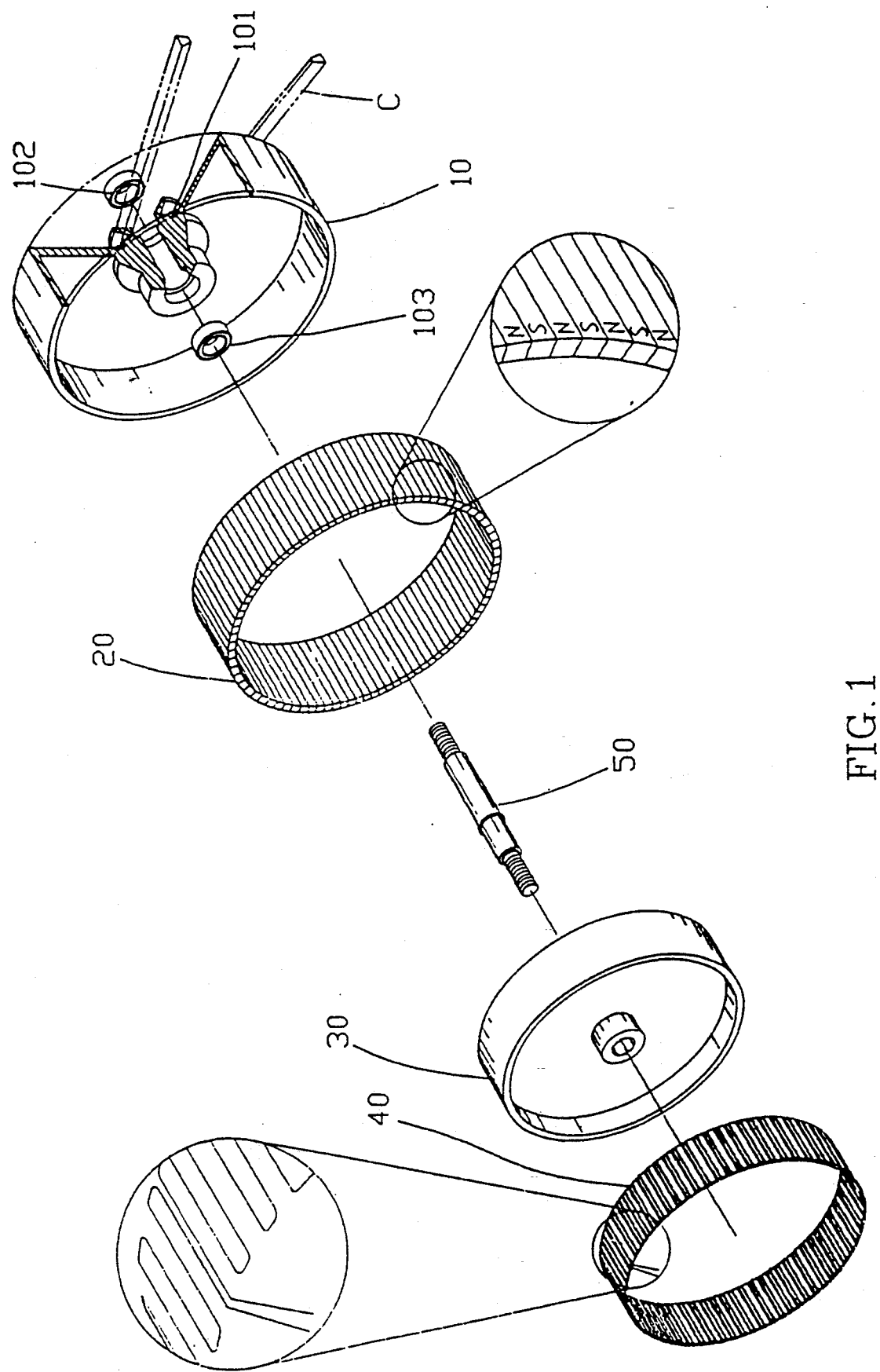
FIG. 1. is a exploded perspective view of the braking device of this invention
Figure 2:
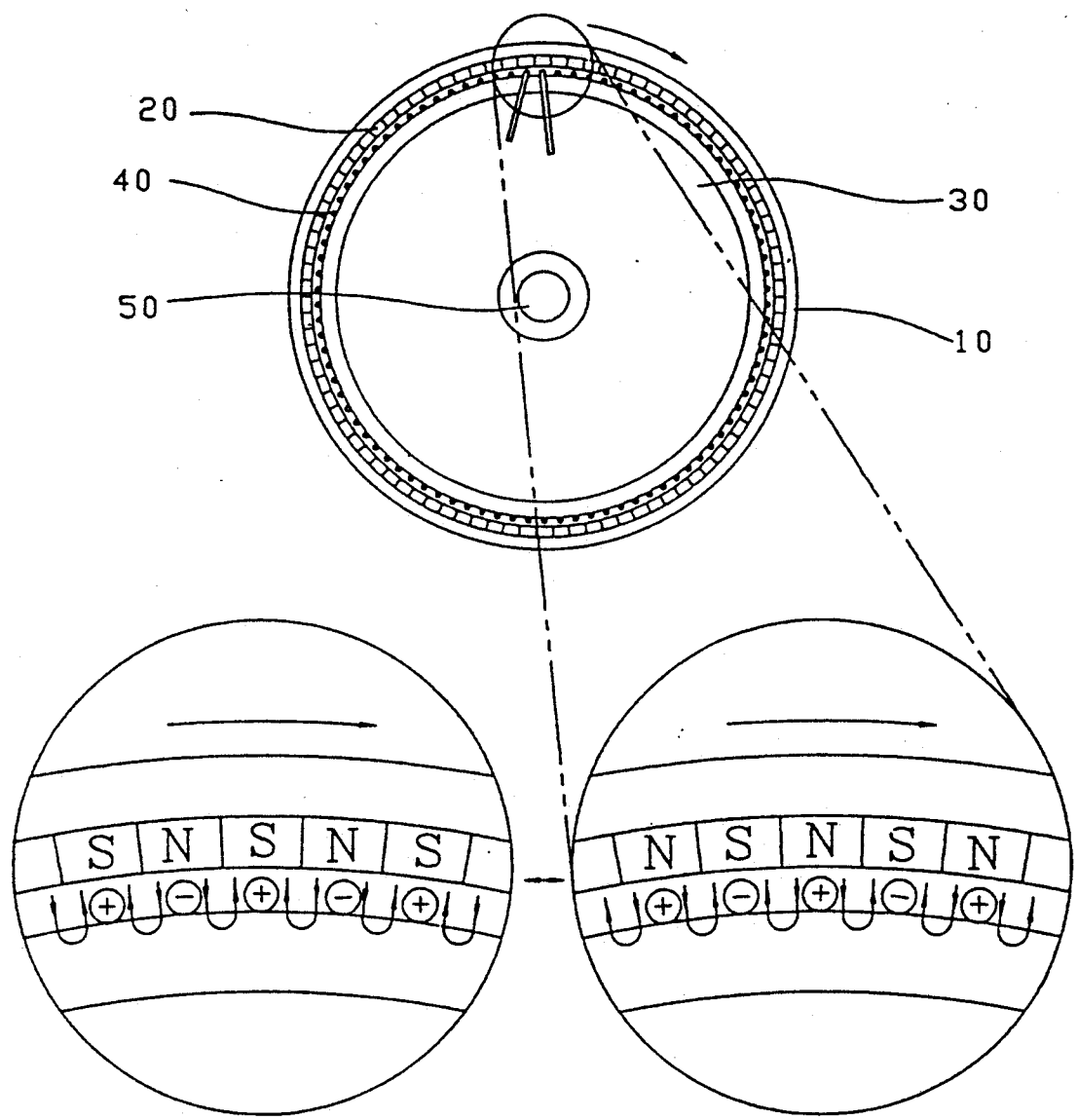
FIG. 2. is a sketch to illustrate the operating mechanism of this invention
Figure 3:
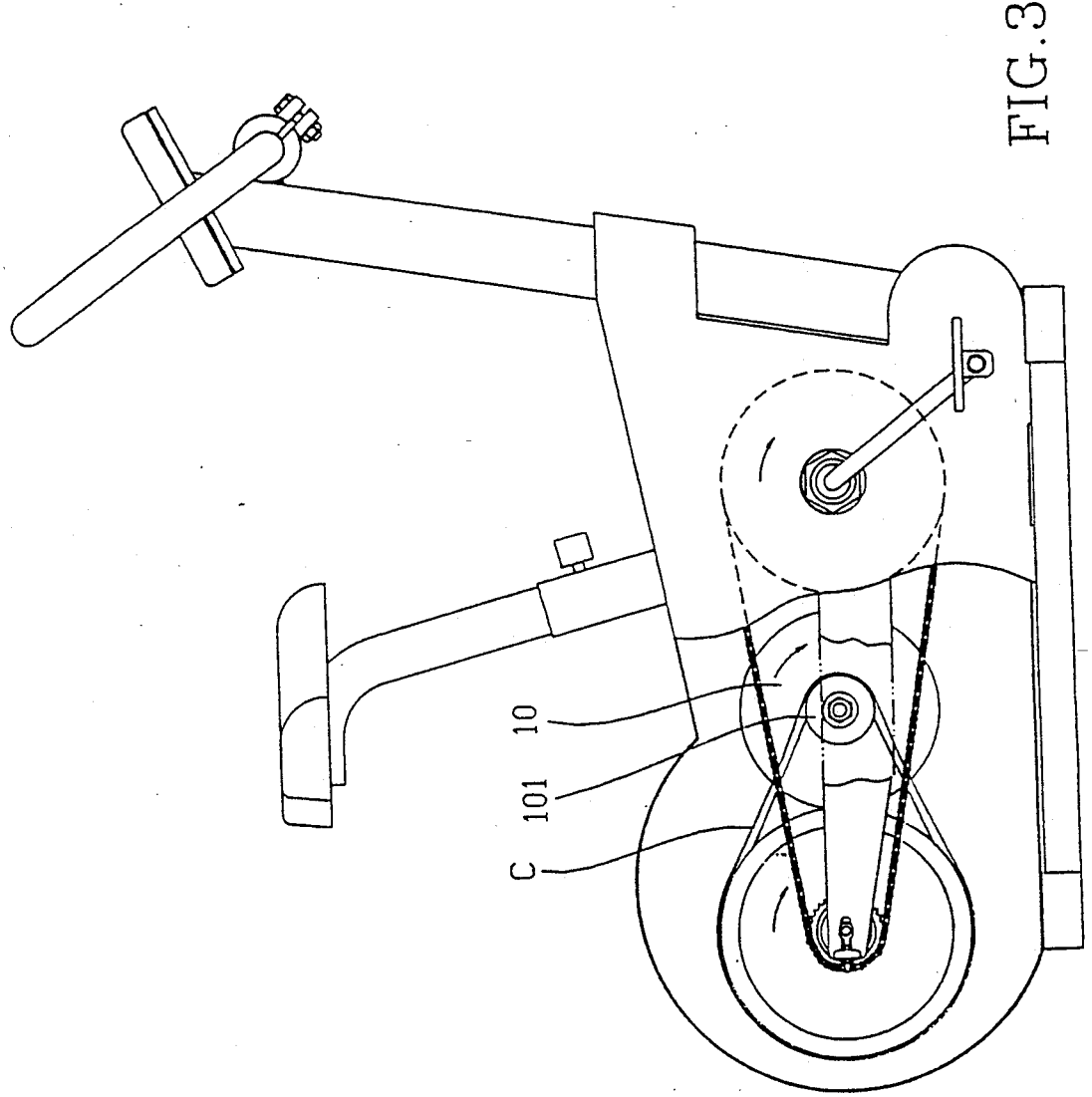
FIG. 3 is a front elevational view depicting this invention as used in a completed bicycle

DESCRIPTION OF THE PREFERRED EMBODIMENT (Refer to FIGS. 1, 2 and 3) In the center of the hub of a rotor 10 is molded an extra wheel for the transmission belt 101, which shares the same pivot hole with the hub. The wheeled hub is externally equipped with pivot bearings 102 and 103 at each side to support the smooth spinning rotor 10. Rubber magnets 20 are tiled onto the inner rim of the rotor 10 with NS magnetic poles inversely aligned side by side, parallel to the spinning axis. A pivot hole is drilled in the center of a stator 30, whose outer rim is pasted a layer of enamel wire, which winds to and fro (i.e., back and forth) in parallel and equal number to the magnetic poles 20, to form a dynamo coil 40. The stator 30 is then placed within the rotor 10 to form a magnetic flux loop with the rubber magnets 20. An axle 50 is pivoted through the rotor 10 and the stator 30, and then mounted on the exercise equipment construction through pivot bearings 102 and 103. This concludes the description of the braking dynamo construction of this invention.

(Refer to FIG. 1 through FIG. 3 in sequence) As the transmission belt C starts the wheel 101 to drive the rotor 10 in smooth spin over the two pivot bearings 102 and 103, the magnetic force lines from the magnetic loop between the rubber magnets 20 and the stator 30 will cut across the coil 40 to produce a potential on the wire of the coil. Suppose that the two ends of the wire are connected to conduct a loop current, an inverse magnetic field opposing the cutting magnetic force lines will be produced by the wire to attract the rotor 10, thus achieving the braking effect. The larger the loop current conducts on the wire, the stronger the inverse magnetic field attracts the rotor 10, and, in effect, the greater the braking force (or impedance) is exerted on the rotor 10. This concludes the operation mechanism of this invention.

To sum up, it can be seen that this invention, indeed, has the desired operating effect. Moreover, it has not yet been found in any publication. However, all figures drawn above are only used to depict a preferred embodiment of this invention and therefore should not be used to define the category of possible implementation of this invention. Accordingly, whatever variation or modification to the characteristics and essence of what is claimed below should fall within the category of this invention to be patented.

What is claimed is:

1. A braking device for indoor exercise bicycles comprising
   a rotor having
      a rim,
      a hub,
      an extra wheel connected to said hub,
      a transmission belt mounted on said extra wheel and mountable on a driving wheel on the exercise bicycle,
      a pivot hole through said hub,
      an axle extending through said pivot hole and supported on both ends by pivot bearings, which facilitate the smooth spinning of said rotor, and
      a plurality of rubber magnets, each with a NS pole, are aligned side by side in an alternating relationship and securely mounted to said rotor rim;
   a stator having
      an outer rim,
      a winding of a coil having a plurality of parallel loops mounted on said stator outer rim, said winding corresponding to said magnetic pole alignment of said rotor to form a magnetic flux loop with said rubber magnets within said rotor; and
   said axle, which assembles said rotor and said stator is mountable in an appropriate location of the exercise bicycle.

2. The braking device as claimed in claim 1 wherein said winding of said coil on the rim of said stator runs to and fro in parallel to form a plurality of loops that are equal in number to number of said NS magnetic poles of said rotor.

3. The braking device as claimed in claim 2 wherein said rotor comprises an outer flange, said rotor rim being located on an inner surface of said flange; and
   said stator being located concentrically inside said rotor outer flange and said stator rim being adjacent to, but spaced from, said rotor rim.

4. The braking device as claimed in claim 1 wherein said rotor comprises an outer flange, said rotor rim being located on an inner surface of said flange; and
   said stator being located concentrically inside said rotor outer flange and said stator rim being adjacent to, but spaced from, said rotor rim.

* * * * *